UNITED STATES PATENT OFFICE.

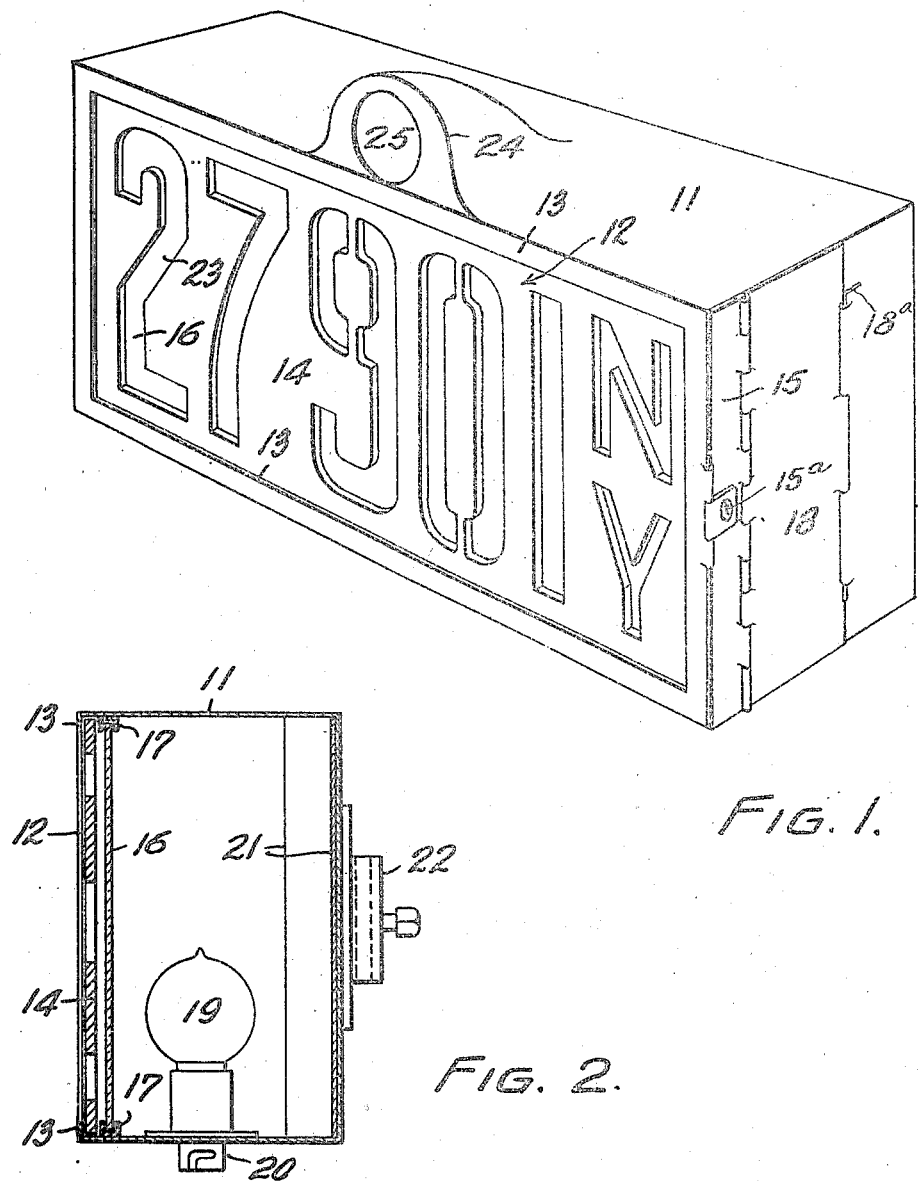

EDWARD LIBBY, OF MONTREAL, QUEBEC, CANADA.

COMBINED SIGNAL AND LICENSE-PLATE.

1,229,483.

Specification of Letters Patent.　　Patented June 12, 1917.

Application filed May 22, 1916.　Serial No. 99,226.

*To all whom it may concern:*

Be it known that I, EDWARD LIBBY, a subject of the King of Great Britain, and resident of the city of Montreal, in the Province of Quebec and Dominion of Canada, have invented certain new and useful Improvements in Combined Signals and License-Plates, of which the following is a full, clear, and exact description.

This invention relates to improvements in combined signals and license plates, and is particularly adapted for use on automobiles to replace the separate rear signal and license plate. It will, however, be understood that a similar apparatus may be used equally well at the front of the car, and that the use of the invention is not limited to automobiles.

It is well known that at the present time, it is extremely difficult to read the license plate of an automobile at night, owing both to accumulations of dust or mud on the plate and to the very poor illumination furnished by the rear light. These disadvantages, combined with the movement of the car, make the license number so difficult to read that in a great many cases drivers, after being concerned in an accident, are able to get away without detection. Obviously, such a condition is an encouragement to careless or reckless drivers, and is therefore a menace to public safety.

This invention aims to overcome these disadvantages to a very great extent, and at the same time to reduce the number of attachments to the car, by providing a combination of the signal and license plate.

The invention consists essentially of a casing having one of its sides formed by the license plate, which is constructed with the inscription thereof cut out in place of merely printed on the surface. A light, and if desired, a suitable reflector are mounted in the casing. When the device is to be used as a rear signal, a sheet of suitable transparent red colored material is positioned between the license plate and light, so that when viewed in the day time, this material shows approximately black through the cut out inscription of the license plate, and when lighted at night shows red.

In the drawings which illustrate the invention:—

Figure 1 is a perspective view of the device.

Fig. 2 is a vertical sectional view near one end illustrating the interior arrangement.

Referring more particularly to the drawings, 11 designates a box-like casing having one entire side open as at 12, with the exception of a small peripheral flange 13 sufficient to hold a license plate 14 to the casing. One end of the casing is provided with a small door 15 having a key operated lock 15ª through which the license plate may be inserted or removed, and also a sheet of transparent colored material 16 positioned close behind the plate 14. This sheet of colored material 16 is mounted in guides 17 carried inside the casing, which are preferably so arranged that they coöperate with the flanges 13 to form guides for the license plate. A further door 18 is provided giving access to the interior of the casing behind the color screen 16 and is provided with a quickly operable fastening such as the pin 18ª. This door permits the insertion and care of a suitable light 19 mounted within the casing behind the plate 14 and screen 16. The light may be electric, as shown in the drawings, or of any other suitable type. In the case of an electric light, a continuation 20 of the lamp socket may be extended through the casing at some suitable point for the reception of an attachment plug to connect the lamp with the source of energy. If desired, a reflector 21 may be provided within the casing on the opposite side of the light from the license plate and may be formed to distribute the light as uniformly as possible to all parts of the plate. At any suitable point, a socket or the like 22 may be provided for coöperation with a bracket fixed to the car for the purpose of supporting the device.

The operation of the device will be readily understood from the foregoing description. The cut-out portions of the license plate provide openings 23 in the form of numerals, letters, etc., through which the screen 16 is exposed. In the day-time, a red or green screen with no light behind it appears black, and therefore the license plate presents the usual appearance. At night, when the light is in use, it shines through the portions of the screen exposed by the license plate openings, and the numerals and letters stand out very clearly, appearing in the color of the screen. When the device is to be used as a rear signal, the screen will be red and the letters of the license will therefore appear red. The area of these openings is considerably greater than the area of the lens in an ordinary rear signal, and as the area is distributed, the signal will, if anything, be visible at greater distances than the ordinary red lamp, and will at shorter distances be much more conspicuous. In addition, the numbers and letters of the license plate will be very distinct and easily read at much greater distances than is possible with the arrangement of license plate illuminated by the signal lamp which is now in general use. The reflector insures uniform illumination of all numerals and letters, and intensifies the light, so that it is quite as effective as the lights at present in use. When the license number is changed from year to year, a new plate of the perforated type instead of a printed plate is supplied to the car owner, and all that is necessary to change the license is to unlock and open the door 15, withdraw the old plate and insert the new one.

Two separate doors 15 and 18 have been shown, which enables the door 15 retaining the license plate and screen to be fastened by a key operated lock, which will prevent tampering with the license plate or screen, and yet leave the door 18 free to open, thus giving instant access to the light. In districts where the law will not permit of the use of illuminated colored letters to replace the signal, a small housing 24 may be added to the top of the casing and provided with the usual colored lens 25.

The advantages of such a device are obvious. The license number is fully as legible in daylight as with the ordinary license plate, and is considerably more so at night. The signal and license plate are combined in one, so that there is only one attachment to the vehicle in place of two as at present. As a signal, the larger area through which the light escapes and the distribution will render the signal more conspicuous.

Having thus described my invention, what I claim is:—

A combined signal and license plate, comprising a casing, a license plate having openings therein in the form of letters and numerals, a colored transparent screen behind said plate, a source of light within the casing, whereby light escaping through the screen and openings of the plate will constitute both a signal and an indication of the license number, a pair of independently operable closures for the casing connected thereto by a hinge common to both closures, one confining the license plate and screen, and the other giving access to the interior of the casing without unconfining the license plate and screen, and a keyless fastening for the other closure.

In witness whereof, I have hereunto set my hand, in the presence of two witnesses.

EDWARD LIBBY.

Witnesses:
S. R. W. ALLEN,
G. M. MORELAND.